US012773919B2

(12) United States Patent
Kobayashi

(10) Patent No.: US 12,773,919 B2
(45) Date of Patent: Oct. 27, 2026

(54) VEHICLE

(71) Applicant: TOYOTA JIDOSHA KABUSHIKI KAISHA, Toyota (JP)

(72) Inventor: Jin Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 649 days.

(21) Appl. No.: 18/455,682

(22) Filed: Aug. 25, 2023

(65) Prior Publication Data

US 2024/0123854 A1 Apr. 18, 2024

(30) Foreign Application Priority Data

Oct. 12, 2022 (JP) ................................ 2022-164132

(51) Int. Cl.
*B60L 53/62* (2019.01)

(52) U.S. Cl.
CPC .......... *B60L 53/62* (2019.02); *B60L 2250/16* (2013.01); *B60L 2260/42* (2013.01)

(58) Field of Classification Search
CPC ............................ B60L 53/62; B60L 2260/16
See application file for complete search history.

(56) References Cited

U.S. PATENT DOCUMENTS

2016/0344210 A1 11/2016 Zhang
2022/0291266 A1 * 9/2022 Svedlund .............. G01R 27/16

FOREIGN PATENT DOCUMENTS

JP 2010-220299 A 9/2010
JP 2013-34349 A 2/2013
JP 2017-507638 A 3/2017

* cited by examiner

*Primary Examiner* — Robert Grant
(74) *Attorney, Agent, or Firm* — Oblon, McClelland, Maier & Neustadt, L.L.P.

(57) ABSTRACT

A vehicle includes a power storage device, a charging circuit capable of external charging by converting AC power from a power system to DC power and charging the DC power to the power storage device when the vehicle is connected to the power system external to the vehicle, and a controller programming to control the charging circuit. The vehicle includes a detection circuit configured to detect the impedance of the charging path from the power system to the power storage device during external charging. The controller is programmed to switch control of the charging circuit when the impedance of the charging path is higher than the threshold value during external charging, compared to when the impedance of the charging path is lower than the threshold value during the external charging.

2 Claims, 2 Drawing Sheets

VEHICLE

CROSS-REFERENCE TO RELATED APPLICATION

The present disclosure claims priority to Japanese Patent Application No. 2022-164132 filed on Oct. 12, 2022, which is incorporated herein by reference in its entirety including specification, drawings and claims.

TECHNICAL FIELD

The present disclosure relates to vehicles.

BACKGROUND

Conventionally, a vehicle is proposed to include a power storage device and a charging circuit capable of converting AC power from a power source to DC power and supplying the DC power to the power storage device when the vehicle is connected to the power source external to the vehicle (see, for example, Patent Document 1). This vehicle estimates impedance of the charging path from the power supply to the power storage device, and notifies the occupants of the vehicle of an abnormality in the charging path when the estimated impedance of the charging path exceeds a reference value.

CITATION LIST

Patent Literature

PTL 1: JP2010-220299

SUMMARY

In the vehicles described above, when the impedance of the charging path is relatively high, the power factor of the charging circuit tends to be low, and there is concern that the output of the charging circuit may fluctuate and noise or abnormal noise may occur.

A main object of the vehicle of the present disclosure is to cope when the impedance of the charging path is relatively high.

The vehicle of the present disclosure employs the following configuration in order to achieve the above primary object.

The present disclosure is directed to a vehicle. The vehicle includes a power storage device, charging circuit configured to be capable of external charging by converting AC power from a power system to DC power and charging the DC power to the power storage device when the vehicle is connected to the power system external to the vehicle, and a controller programming to control the charging circuit. The vehicle includes a detection circuit configured to detect an impedance of a charging path from the power system to the power storage device during the external charging. The controller is programmed to switch control of the charging circuit when the impedance of the charging path is higher than a threshold value during the external charging, compared to when the impedance of the charging path is lower than the threshold value during the external charging.

The vehicle of the present disclosure switches the control of the charging circuit when the impedance of the charging path from the power system to the power storage device is higher than the threshold value during external charging, compared to when the impedance of the charging path is lower than the threshold value during the external charging. The vehicle suppresses output fluctuations of the charging circuit and the generation of noise and abnormal noise by appropriately switching the control of the charging circuit when the impedance of the charging path is higher than the threshold value.

DESCRIPTION OF EMBODIMENTS

Figure 1:
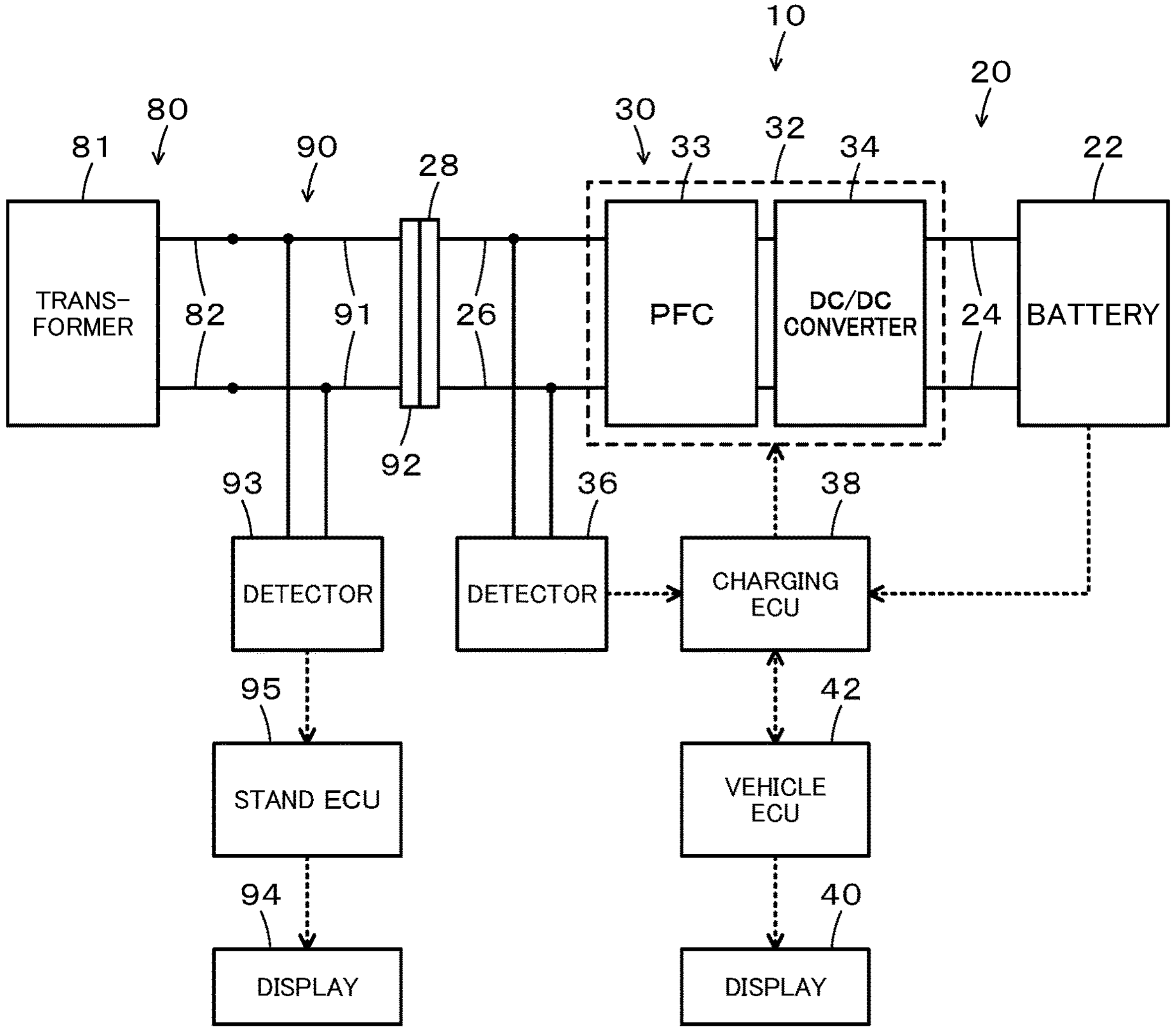
FIG. 1 is a schematic diagram of a charging system including a vehicle.

Embodiments of the present disclosure will be described with reference to the drawings. FIG. 1 is a schematic diagram of a charging system 10 including a vehicle 20 as the embodiment. In addition to the vehicle 20, the charging system 10 includes a power system 80 and a charging stand 90.

The power system 80 includes a transformer 81 and a power line 82. The transformer 81 converts AC power of several thousand volts on a high voltage distribution line into 100 V or 200 V AC power and supplies the AC power to the power line 82 as a low voltage distribution line. The power line 82 is connected to the power line 91 of the charging stand 90.

The charging stand 90 is located at a home or a charging station. The charging stand 90 includes a power line 91, a stand side connector 92, a detector 93, a display 94, and an electronic control unit for the stand (hereinafter referred to as "stand ECU") 95. The power line 91 is connected to the stand side connector 92 and the power line 82 of the power system 80. The stand side connector 92 is configured to connect to the vehicle side connector 28 of the vehicle 20. The detector 93 is attached to the power line 91 and detects the impedance Zs of the part electrically connected to the power line 91. The display 94 is configured as a touch panel type display showing various information. The stand ECU 95 includes a microcomputer having a CPU, a ROM, a RAM, a flash memory, input/output ports, and communication ports. For example, the stand ECU 95 inputs an impedance Zs from the detector 93 via an input port. For example, the stand ECU 95 outputs a control signal to the display 94 via an output port.

The vehicle 20 is configured as a battery electric vehicle, a hybrid electric vehicle, or a fuel cell electric vehicle. As illustrated, the vehicle 20 includes a battery 22 as a power storage device, power lines 24 and 26, a vehicle side connector 28, a charging device 30, a display 40, and a vehicle electronic control unit (hereinafter referred to as "vehicle ECU") 42. For example, the battery 22 is configured as a lithium ion rechargeable battery or nickel metal hydride battery. The power line 24 is connected to the battery 22 and the charging circuit 32 of the charging device 30. The power line 26 is connected to the vehicle side connector 28 and the charging circuit 32. The vehicle side connector 28 is configured to connect to the stand side connector 92 of the charging stand 90.

The charging device 30 includes a charging circuit 32, a detection circuit 36, and a charging electronic control unit (hereinafter referred to as "charging ECU") 38. The charging circuit 32 is connected to the battery 22 via the power line 24 and to the vehicle side connector 28 via the power line 26. The charging circuit 32 is configured to perform external charging when the vehicle side connector 28 of the vehicle 20 is connected to the stand side connector 92 of the charging stand 90. The external charging is the charging of the battery 22, in which AC power supplied from the power system 80 via the charging stand 90 is converted to DC power of any voltage by the charging circuit 32 and supplied to the battery 22. The charging circuit 32 is equipped with, in order from the power line 26 side, a power factor correction circuit (PFC) 33, a DC/DC converter 34 connected to the power factor correction circuit 33. The power factor correction circuit 33 is configured as a power factor correction circuit with switching elements. The DC/DC converter 34 is configured as an isolated DC/DC converter with switching elements and a transformer.

The detection circuit 36 is attached to the power line 26 and detects the impedance Zv of the portion electrically connected to the power line 26. During the external charging, the portion electrically connected to the power line 26 corresponds to the portion from the power system 80 to the primary side (the power factor correction circuit 33 side) of the transformer of the DC/DC converter 34 in the charging path from the power system 80 to the battery 22. When the vehicle side connector 28 and the stand side connector 92 are connected and the external charging is not being performed, the portion electrically connected to the power line 26 corresponds to the portion on the power system 80 side of the charging circuit 32. When the vehicle side connector 28 and the stand side connector 92 are connected, the impedances Zs and Zv are approximately the same.

The charging ECU 38 includes a microcomputer having a CPU, a ROM, a RAM, a flash memory, input/output ports, and communication ports. For example, the charging ECU 38 inputs a voltage Vb of the battery 22 from a voltage sensor, a current Ib of the battery 22 from a current sensor, a temperature Tb of the battery 22 from a temperature sensor, and an impedance Zv from the detection circuit 36 via the input ports. For example, the charging ECU 38 outputs a control signal to the charging circuit 32 via the output ports. The charging ECU 38 calculates state of charge SOC of the battery 22 based on the integrated value of the current Ib of the battery 22. The charging ECU 38 is connected to the vehicle ECU 42 via the communication port.

The display 40 is configured as a display showing various types of information. The vehicle ECU 42 includes a microcomputer having a CPU, a ROM, a RAM, a flash memory, input/output ports, and communication ports. For example, the vehicle ECU 42 outputs a control signal to the display 94 via the output port. The vehicle ECU 42 is connected to the charging ECU 38 via the communication port.

In the vehicle 20 of the present embodiment, when the stand side connector 92 and the vehicle side connector 28 are connected while the vehicle is parked at home or at a charging station, and when the charge start condition for the battery 22 is satisfied, the charging ECU 38 controls the charging circuit 32 so that the external charge is performed. Therefore, the battery 22 is charged. When the charge end condition of the battery 22 is satisfied, the charging ECU 38 stops the charging circuit 32. Therefore, charging of the battery 22 is terminated. The charging start condition is, for example, a condition in which the user indicates the start of charging, a condition in which the charging start time set by the user is reached, a condition in which the charging start time based on the scheduled departure time set by the user is reached, and the like. The charging termination condition is, for example, a condition in which the state of charge SOC of the battery 22 reaches equal to or higher than the threshold value Sch, a condition in which the user indicates the termination of charging, a condition in which the scheduled departure time set by the user is reached, and the like.

Figure 2:
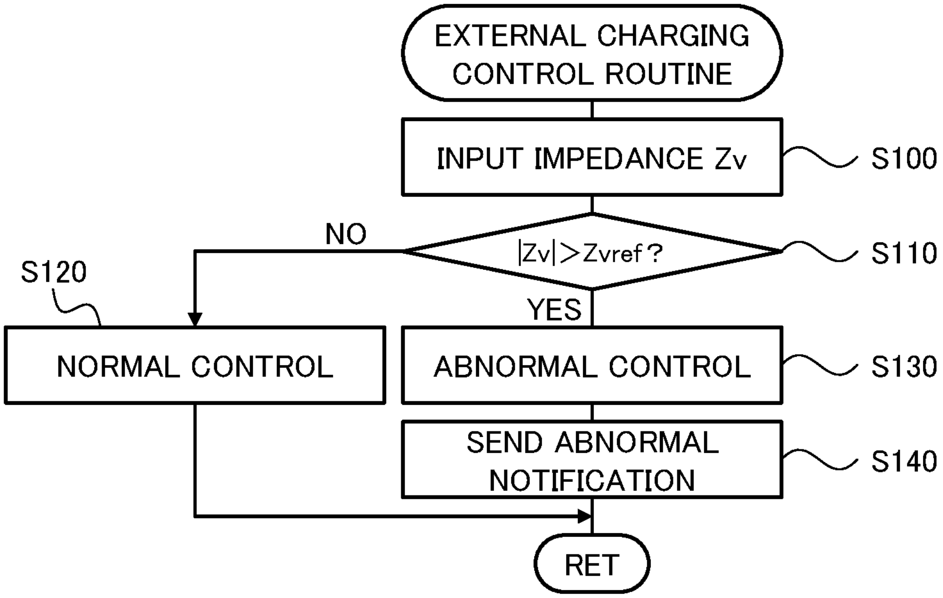
FIG. 2 is a flowchart showing an example of an external charging control routine.

Next, the operation of the vehicle 20 in the present embodiment will be described. In particular, details of the operation of the vehicle 20 during the external charging will be described. FIG. 2 is a flowchart showing an example of an external charging control routine executed by the charging ECU 38. This routine is repeatedly executed from the time the charging start condition for the battery 22 is satisfied until the charging termination condition is satisfied.

When the routine in FIG. 2 is executed, the charging ECU 38 inputs the impedance Zv from the detection circuit 36 (step S100), and compares the magnitude of the input impedance Zv with the threshold value Zvref (Step S110). The threshold value Zvref is the threshold value used to determine whether or not the impedance Zv is within the allowable range (normally assumed range). The cases in which impedance Zv becomes high include, for example, when the path (the power line 82) from the transformer 81 of the power system 80 to the charging stand 90 is long, or when the path (the power line 91 and the power line 26) from the charging stand 90 to the charging circuit 32 of the vehicle 20 are long. This is because the longer these paths are, the greater the effect of the inductance component of the paths.

When the magnitude of the impedance Zv is less than or equal to the threshold value Zvref in step S110, the charging ECU 38 determines that the impedance Zv is within the allowable range and executes normal control of the charging circuit 32 (step S120). This routine is terminated.

When the magnitude of the impedance Zv is higher than the threshold value Zvref in step S110, the charging ECU 38 determines that the impedance Zv is outside the allowable range. The charging ECU 38 executes the abnormal control of the charging circuit 32 (step S130), and also sends a notification that the impedance Zv is abnormal to the vehicle ECU 42 (step S140). This routine is terminated. When the impedance Zv is outside the allowable range, the power factor of the power input to the charging circuit 32 tends to be lower than when the impedance Zv is within the allowable range. This is due to the effect of the inductance component of the charging path from the power system 80 to the battery 22. Therefore, in the abnormal control of the charging circuit 32, the charging ECU 38 controls the charging circuit 32 (in particular, the power factor correction circuit 33) so that the power factor of the power input to the charging circuit 32 is improved based on the impedance Zv. An improvement in the power factor means that the power factor approaches the power factor during normal control. For example, the charging ECU 38 may control the charging circuit 32 (in particular, the power factor correction circuit 33) so that the difference between the input current of the charging circuit 32 detected by the AC current sensor not shown and the target current is reduced. The target current is set such that the power factor of the power input to the charging circuit 32 is a predetermined power factor (e.g., 1 or slightly lower). The charging ECU 38 may detect the pulsation component of the input current of the charging circuit 32 while changing the control cycle of the charging circuit 32, and adjust the control cycle of the charging circuit 32 so that the pulsation component is at or near its minimum. Such control allows the vehicle 20 to suppress the inconvenience caused by a low power factor of the power input to the charging circuit 32. The inconveniences include, for example, output fluctuations of the charging circuit 32 and the generation of noise and abnormal noise. When the vehicle ECU 42 receives from the charging ECU 38 that the impedance Zv is abnormal, the vehicle ECU 42 causes the display 40 to display this fact. Therefore, a user who checked the display recognizes that the impedance Zv is abnormal.

The operation of the vehicle 20 during the external charging has been described. The operation of the charging stand 90 during the external charging is then described. The stand ECU 95 inputs the impedance Zs from the detection circuit 36. The stand ECU 95 compares the magnitude of the impedance Zs with the threshold value Zsref. The threshold value Zsref is, for example, the same value as the threshold value Zvref. When the magnitude of the impedance Zs is equal to or less than the threshold value Zvref, the stand ECU 95 determines that the impedance Zs is within the allowable range and does nothing. When the magnitude of the impedance Zs is higher than the threshold value Zvref, the stand ECU 95 determines that the impedance Zs is outside the allowable range and causes the display 94 to display that the impedance Zs is abnormal. Therefore, the user who checked the display 94 recognizes that the impedance Zs is abnormal.

In this embodiment described above, in the vehicle 20, when the magnitude of the impedance Zv is equal to or higher than the threshold value Zvref during the external charging, the charging ECU 38 controls the charging circuit 32 (in particular, the power factor correction circuit 33) so that the power factor of the power input to the charging circuit 32 is improved. Therefore, the vehicle 20 suppresses the inconvenience caused by the low power factor of the power input to the charging circuit 32. The inconveniences include, for example, output fluctuations of the charging circuit 32 and the generation of noise and abnormal noise.

Further, in the vehicle 20 of the present embodiment, when the magnitude of impedance Zv is higher than the threshold value Zvref, the vehicle ECU 42 causes the display to display that the impedance Zv is abnormal. Therefore, the user who checked the display 40 recognizes that the impedance Zv is abnormal.

In the embodiment described above, when the magnitude of the impedance Zv is higher than the threshold value Zvref, the vehicle ECU 42 causes the display 40 to display that the impedance Zv is abnormal. However, the vehicle ECU 42 may cause the speaker to output sound that the impedance Zv is abnormal. Also, the vehicle ECU 42 may not have to notify the display 40 or the speaker that the impedance Zv is abnormal.

In the embodiment described above, when the magnitude of the impedance Zs is higher than the threshold value Zsref, the stand ECU 95 causes the display 94 to display that the impedance Zs is abnormal. However, the stand ECU 95 may cause the speaker to output sound that the impedance Zs is abnormal. Also, the stand ECU 95 may not have to notify the display 94 or the speaker that the impedance Zs is abnormal.

In the embodiment described above, the vehicle ECU 42 is connected to the charging ECU 38 via a communication port. However, instead of or in addition to this, the vehicle ECU 42 may input the impedance Zv from the detection circuit 36.

In the embodiments described above, the vehicle 20 includes the charging ECU 38 and the vehicle ECU 42. However, the charging ECU 38 and the vehicle ECU 42 may be configured as a single unit.

In this embodiment described above, the vehicle includes a power storage device, a charging circuit capable of external charging by converting AC power from a power system to DC power and charging the DC power to the power storage device when the vehicle is connected to the power system external to the vehicle, and a controller programming to control the charging circuit. The vehicle includes a detection circuit configured to detect the impedance of the charging path from the power system to the power storage device during external charging. The controller is programmed to switch control of the charging circuit when the impedance of the charging path is higher than the threshold value during external charging, compared to when the impedance of the charging path is lower than the threshold value during the external charging.

The vehicle of the present disclosure switches the control of the charging circuit when the impedance of the charging path from the power system to the power storage device is higher than the threshold value during external charging, compared to when the impedance of the charging path is lower than the threshold value during the external charging. The vehicle suppresses output fluctuations of the charging circuit and the generation of noise and abnormal noise by appropriately switching the control of the charging circuit when the impedance of the charging path is higher than the threshold value.

In the vehicle of the present disclosure, the charging circuit may include a power factor correction circuit and an isolated converter connected to the power factor correction circuit and having a transformer, the detection circuit may be mounted on the power system side of the charging circuit of the charging path, and the controller may be programmed to control the power factor correction circuit to improve a power factor of an input power of the charging circuit when the impedance of the charging path is higher than the threshold value during the external charging. Therefore, the vehicle more appropriately suppresses output fluctuations of the charging circuit and generation of noise and abnormal noise when the impedance of the charging path is higher than the threshold value.

In the vehicle of the present disclosure, the vehicle may include a reporting module configured to report information, and the controller may be programmed to cause the reporting module to report that the impedance of the charging path is abnormal when the impedance of the charging path is higher than the threshold value during the external charging. Therefore, a user recognizes that the impedance of the charging path.

The following describes the correspondence relationship between the primary elements of the embodiment and the primary elements of the present disclosure described in Summary. In the embodiment, the battery 22 corresponds to the "power storage device," the charging circuit 32 corresponds to the "charging circuit," the charging ECU 38 and the vehicle ECU 42 correspond to the "controller," and the detection circuit 36 corresponds to the "detection circuit.

The correspondence relationship between the primary elements of the embodiment and the primary elements of the present disclosure described in summary is an example of how the embodiment specifically explains the present disclosure described in summary. Therefore, the correspondence relationship does not limit the elements of the present disclosure described in summary. In other words, interpretation of the present disclosure described in summary should be based on the description in that section. The embodiments are only one specific example of the present disclosure described in summary.

The embodiments for implementing the present disclosure have been described. The present disclosure is in no way limited to such embodiments. The present disclosure can be embodied in various forms without departing from the gist of the present disclosure.

INDUSTRIAL APPLICABILITY

The present disclosure is applicable to the vehicle manufacturing industry and other applications.

What is claimed is:

1. A vehicle, comprising:

a power storage device;

a charging circuit configured to be capable of external charging by converting AC power from a power system to DC power and charging the DC power to the power storage device when the vehicle is connected to the power system external to the vehicle;

a controller programming to control the charging circuit; and a detection circuit configured to detect an impedance of a charging path from the power system to the power storage device during the external charging, wherein the controller is programmed to switch control of the charging circuit when the impedance of the charging path is higher than a threshold value during the external charging, compared to when the impedance of the charging path is lower than the threshold value during the external charging, the charging circuit includes a power factor correction circuit and an isolated converter connected to the power factor correction circuit and including a transformer, the detection circuit is mounted on a power system side of the charging circuit of the charging path, and the controller is programmed to control the power factor correction circuit to improve a power factor of an input power of the charging circuit when the impedance of the charging path is higher than the threshold value during the external charging.

2. The vehicle according to claim 1, further comprising:

a reporting module configured to report information, wherein the controller is programmed to cause the reporting module to report that the impedance of the charging path is abnormal when the impedance of the charging path is higher than the threshold value during the external charging.

* * * * *